US010932615B1

(12) United States Patent
Floyd et al.

(10) Patent No.: US 10,932,615 B1
(45) Date of Patent: Mar. 2, 2021

(54) MICROWAVEABLE HEAT RESERVOIR FOR FOOD

(71) Applicants: Jon C. Floyd, Combine, TX (US); Eron Cavazos, Combine, TX (US)

(72) Inventors: Jon C. Floyd, Combine, TX (US); Eron Cavazos, Combine, TX (US)

(*) Notice: Subject to any disclaimer, the term of this patent is extended or adjusted under 35 U.S.C. 154(b) by 247 days.

(21) Appl. No.: 16/046,071

(22) Filed: Jul. 26, 2018

(51) Int. Cl.
| | |
|---|---|
| *H05B 6/80* | (2006.01) |
| *A47J 36/04* | (2006.01) |
| *A47J 36/02* | (2006.01) |
| *B65D 13/02* | (2006.01) |
| *B65D 85/72* | (2006.01) |
| *B65D 81/38* | (2006.01) |

(52) U.S. Cl.
CPC ............. *A47J 36/027* (2013.01); *A47J 36/04* (2013.01); *B65D 13/02* (2013.01); *B65D 81/3837* (2013.01); *B65D 85/72* (2013.01)

(58) Field of Classification Search
CPC ......... A47J 36/027; A47J 36/04; B65D 13/02; B65D 81/3837; B65D 85/72
USPC .... 219/687, 730, 439, 759, 451.1, 530, 540, 219/731, 735, 725, 727, 728; 99/DIG. 14, 324, 339; 126/246, 400; 426/107, 234, 241, 243, 113
See application file for complete search history.

(56) References Cited

U.S. PATENT DOCUMENTS

| | | | | |
|---|---|---|---|---|
| 2004/0232144 A1* | 11/2004 | Edmark | ................ | A47J 36/027 219/735 |
| 2006/0237451 A1* | 10/2006 | Sameuls | ................ | A47J 36/027 219/730 |
| 2016/0135640 A1* | 5/2016 | Yang | ....................... | F28F 13/00 428/34.1 |

* cited by examiner

*Primary Examiner* — Quang T Van
(74) *Attorney, Agent, or Firm* — Jeffrey Roddy

(57) ABSTRACT

An apparatus to speed the heating of a soup-type comestible and to assist in the heat retention of the comestible includes a lithic body that is microwavable and food safe. The apparatus when placed in a bowl, arranges a quantity of soup-type comestible into a form readily heated by microwaves, and the apparatus is capable of functioning as a heat absorber and thermal reservoir to lose heat to the surrounding soup-type comestible after removal from the microwave oven in order to maintain a temperature for the comestible that is desirable.

2 Claims, 20 Drawing Sheets

MICROWAVEABLE HEAT RESERVOIR FOR FOOD

FIELD

The invention relates generally to food preparation and serving.

BACKGROUND

Comestibles such as soup are prone to uneven heating when heated by a microwave oven even if the microwave oven is equipped with a carousel. If the soup is thick or of varying consistency, the problem of uneven heating is made worse. A common remedy for the problem of uneven heating is to stop the oven, remove the soup, stir the soup and return it to the oven for additional heating. However, removing the soup to stir and stopping and restarting the oven is inconvenient and wastes time.

It would be desirable to provide a microwavable and food safe apparatus that facilitates the even heating of a soup-type comestible and furthermore, provides for the retention of heat once the comestible is removed from the oven.

It would be further desirable if the foregoing apparatus were to be simply constructed, microwavable, food safe, durable and easily cleanable.

SUMMARY

In a general aspect of the present invention, an apparatus for the local amplification of microwave energy applied to a food product and one that functions effectively as a heat reservoir for a soup-type comestible includes a small column of marble, another metamorphic rock or an igneous rock with a top end that includes a heat resistant handle portion and a base portion. The base portion includes a bottom surface that may include a slight concavity. In some implementations, the column of marble is cylindrical, between 2 and 3 inches in height and capped at opposite ends by a top member and a base member respectively. The apparatus is placed in the center of a bowl containing soup to be microwaved so that at least a portion of a bare surface of the column is submerged in and directly exposed to the soup. Typically, the heat resistant handle will reside above the surface of the soup when heating. The soup is heated according to directions depending on the type of soup and the wattage of the microwave oven; e.g., 2-4 minutes. In one controlled experiment, two separate quantities (16 oz) of tomato soup were each placed in two separate identical bowls. One of the bowls included the instant apparatus. Each of the bowls were placed in the center of a 900 watt microwave oven and microwaved on high for 2 minutes. The soup in the bowl containing the instant apparatus exited the microwave 11 degrees warmer than the bowl without the apparatus. Moreover, after 5 minutes the temperature of the bowl containing the apparatus was 13.2 degrees warmer than the bowl without the apparatus. The apparatus effectively amplifies the heating effect of the microwaves when the soup is being microwaved and afterward serves as a heat reservoir conducting heat to the surrounding soup. Because marble is not typically excited by microwave energy—at least in the wattage found in microwave ovens, it is thought that the lithic column may deflect or scatter microwaves circumferentially about the bowl, thus heating the soup, with the marble column subsequently absorbing some of the heat energy from the soup through conduction. However, experiments conducted with green marble may indicate that the serpentine constituent in green marble; particularly the magnesium contained in the lattice, may be excited by microwave radiation and transfer the heat to the non-excitable constituent of the lithic body. It should be understood that stone is selected for the lithic body of the apparatus based on both thermal conductivity and thermal density properties. Some species of green marble have been found by the inventor to possess a desirable balance of thermal conductivity and thermal density for its intended use. Certain species of soapstone, granite and basalt may also be suitable. Rocks containing mineral constituents having a metal within the crystalline lattice have been found to be excellent heat reservoirs when exposed to microwave radiation.

While in the particular embodiments disclosed herein, the column material is either a green marble or a granite, other lithic species may be suitable.

While in the particular embodiments disclosed herein, the column is shown as cylindrical, other columnar shapes with any number of sides may be suitable, or, the column may have a twisted configuration, e.g., "barley twist," be straight sided, faceted, or include an entasis bulge.

While in the particular embodiments disclosed herein, a base portion includes a larger width than the column portion, the base portion may be substantially the same width as the column portion.

While in the particular embodiments disclosed herein, the top portion includes a larger width than the column portion, the top portion may be substantially the same width as the column portion.

While in the particular embodiments disclosed herein, the handle portion is a plastic such as polypropylene, or a ceramic, other materials with low dielectric loss properties may be suitable.

It should be understood that the features, objects and aspects of any one embodiment may be added to or combined with the features, objects or aspects of any other embodiment.

BRIEF DESCRIPTION OF THE DRAWING FIGURES

Figure 1:
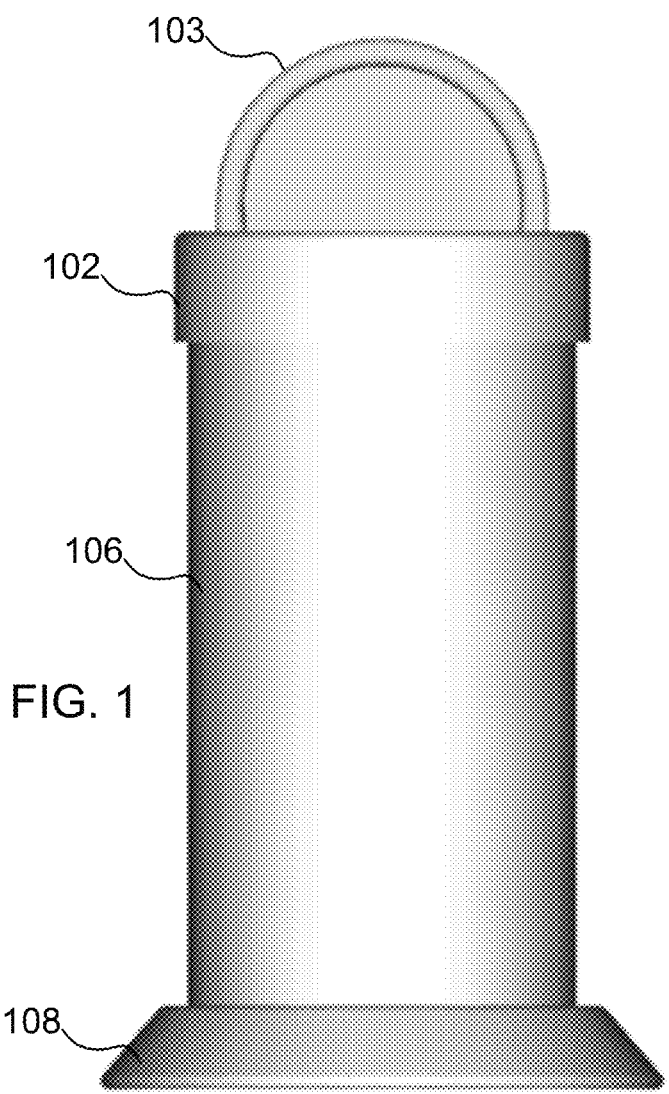
FIG. 1 is a side elevation of one embodiment according to the present invention.

REFERENCE TO THE NUMBERED ELEMENTS 100 food warming apparatus
102 top portion
103 handle portion
104 recess
106 lithic body
108 base
110 indentation Definitions In the following description, the term "lithic body" refers to a stone body that may be marble, serpentine, granite, jade, jadite, soapstone or other stone that is well suited as a heat reservoir, that is, stone that absorbs heat readily from its surroundings and is capable to losing heat gradually to a surrounding fluid mass such as a soup-type comestible. The term "indentation" means a concavity or recess that is configured to adapt to a bowl with a slightly bulging inside bottom surface. The term "marble" means a metamorphic rock comprised at least in part of carbonate minerals. The term "serpentine" or refers to minerals that lend green coloration to some metamorphic rocks such as "serpentinite" and some marble and that typically includes a crystalline magnesium constituent—sometimes referred to as hydrous magnesium silicate; e.g., Vermont quarried serpentinite. The term "soup-type comestible" means a soup, such as tomato soup, a stew, a broth or any homogeneous or non-homogeneous semi solid or fluid comestible that is typically placed in a bowl prior to microwave heating. Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references listed in this disclosure are incorporated by reference in their entirety for all purposes. In case of conflict, the present specification, including explanations of terms, will control. In addition, the materials, methods, and examples are illustrative only and not intended to be limiting.

DETAILED DESCRIPTION OF THE EMBODIMENTS

Figure 2:
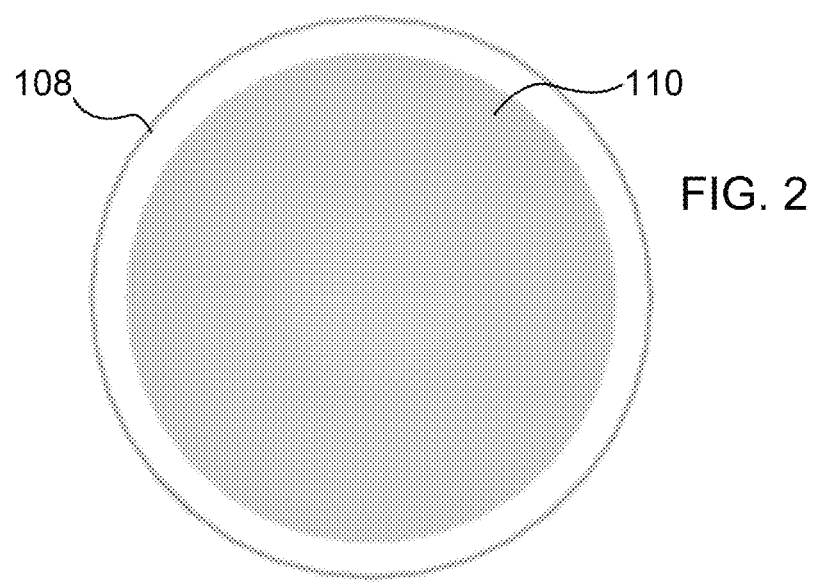
FIG. 2 is bottom plan view the embodiment shown in (FIG. 1)
Figure 3:
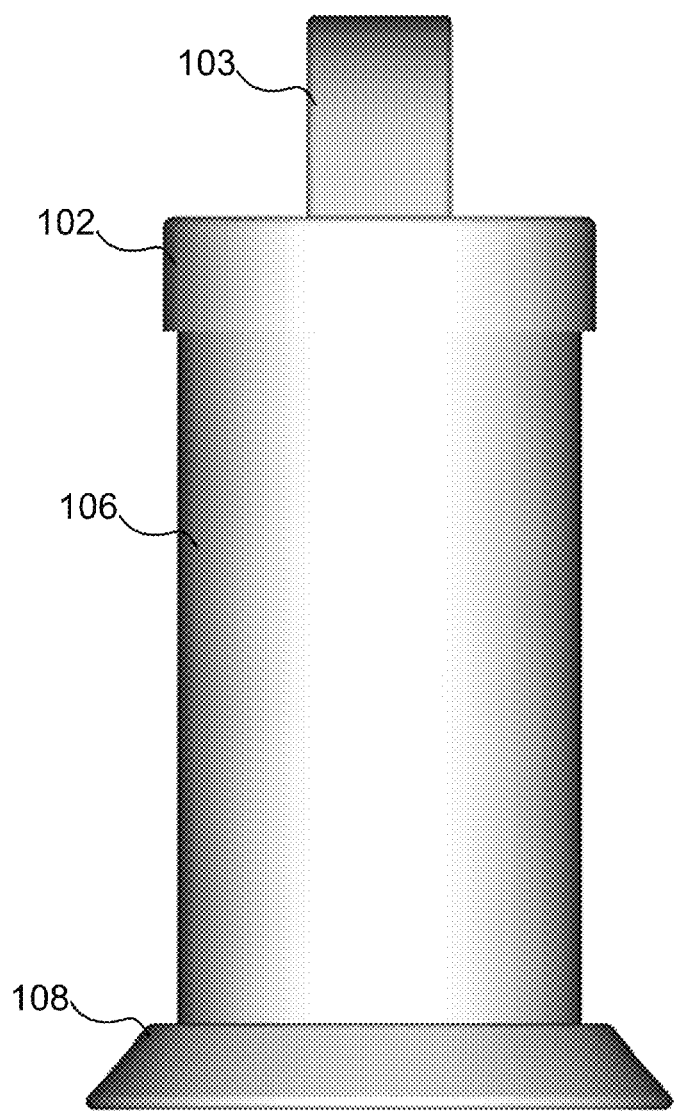
FIG. 3 is another side elevation of the embodiment shown in (FIG. 1)
Figure 4:
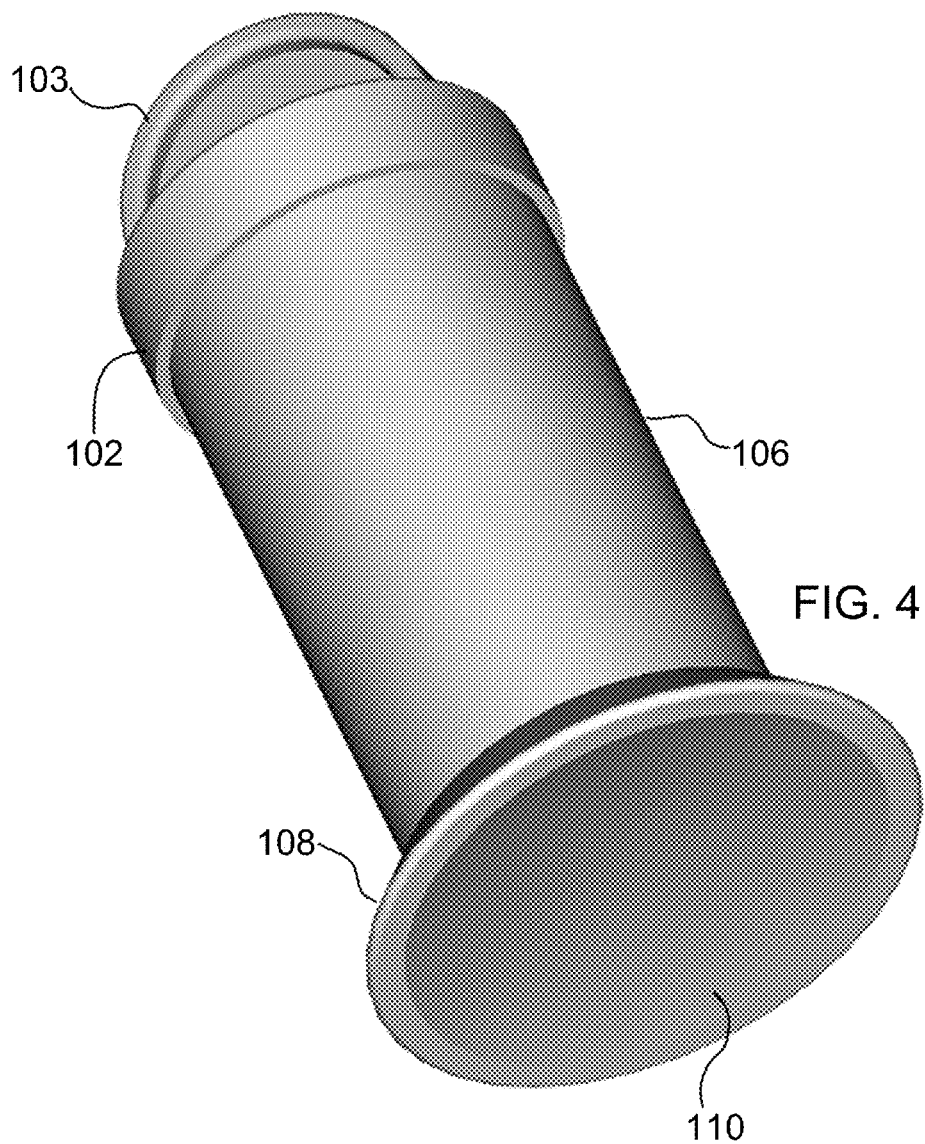
FIG. 4 is a tilted isometric view of the embodiment shown in (FIG. 1) showing a bottom of a food warming apparatus.
Figure 5:
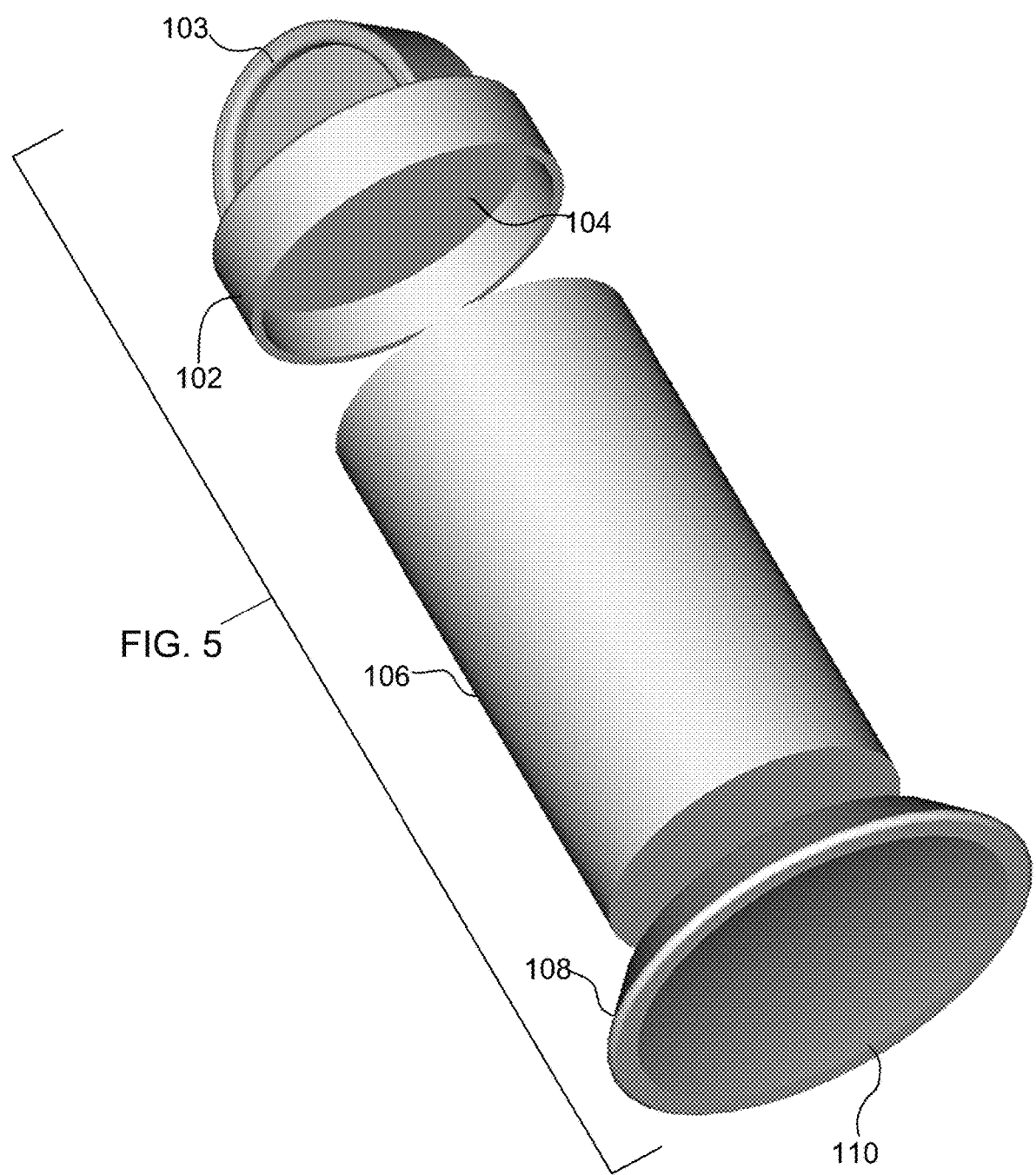
FIG. 5 is an exploded view of the embodiment shown in (FIG. 1)
Figure 6:
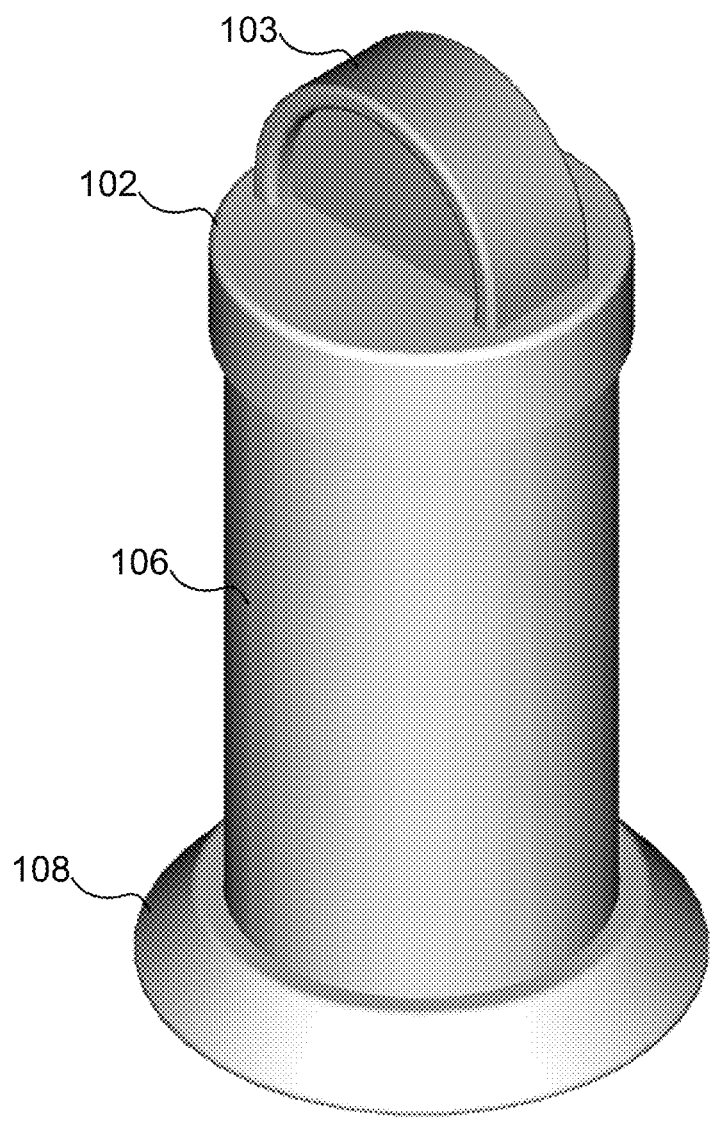
FIG. 6 is an isometric view of the embodiment shown in (FIG. 1) in a typical standing disposition.
Figure 7:
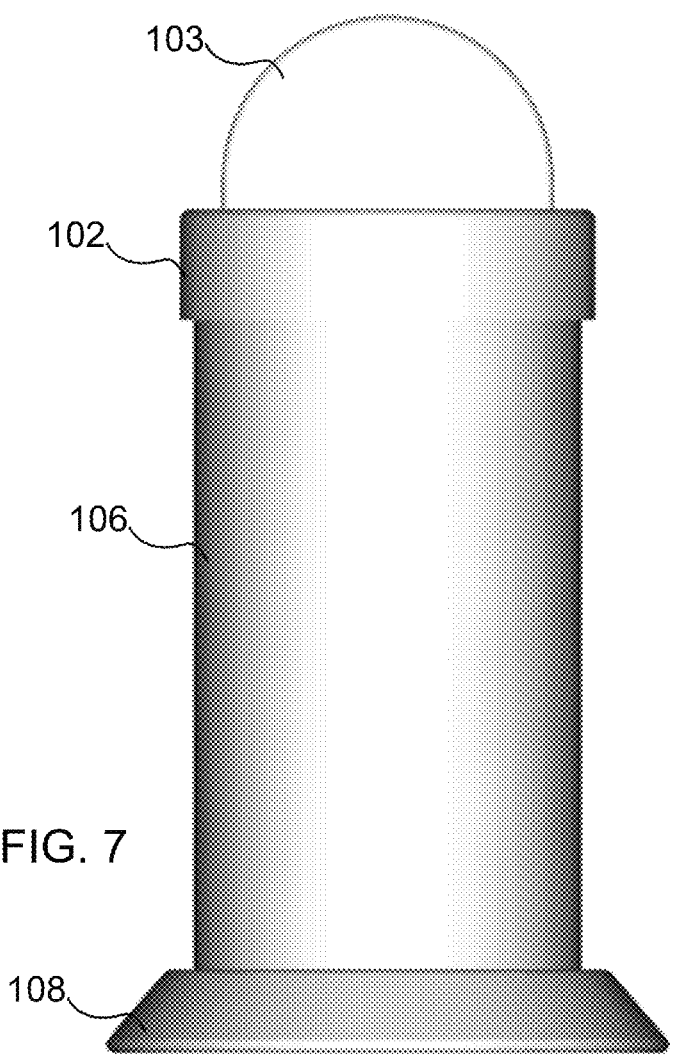
FIG. 7 is a side elevation of one embodiment according to the present invention.
Figure 8:
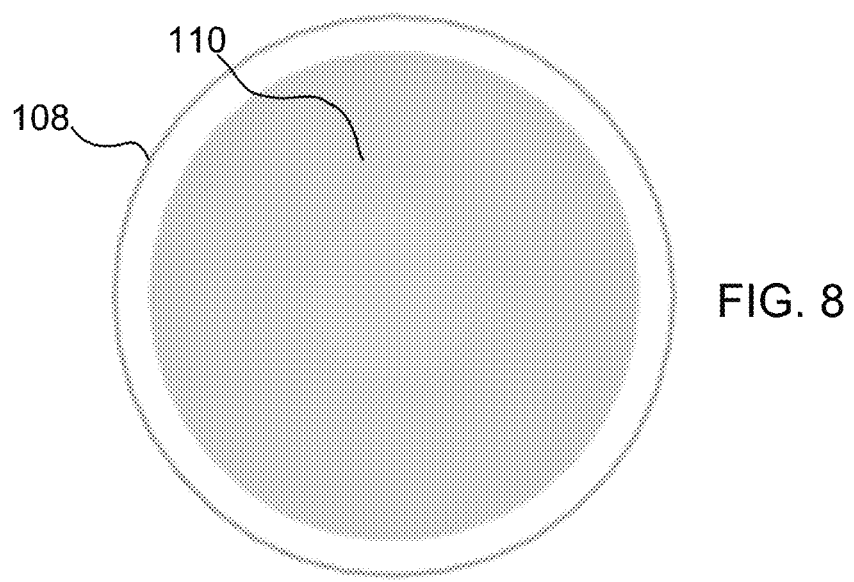
FIG. 8 is bottom plan view of the embodiment shown in (FIG. 7)
Figure 9:
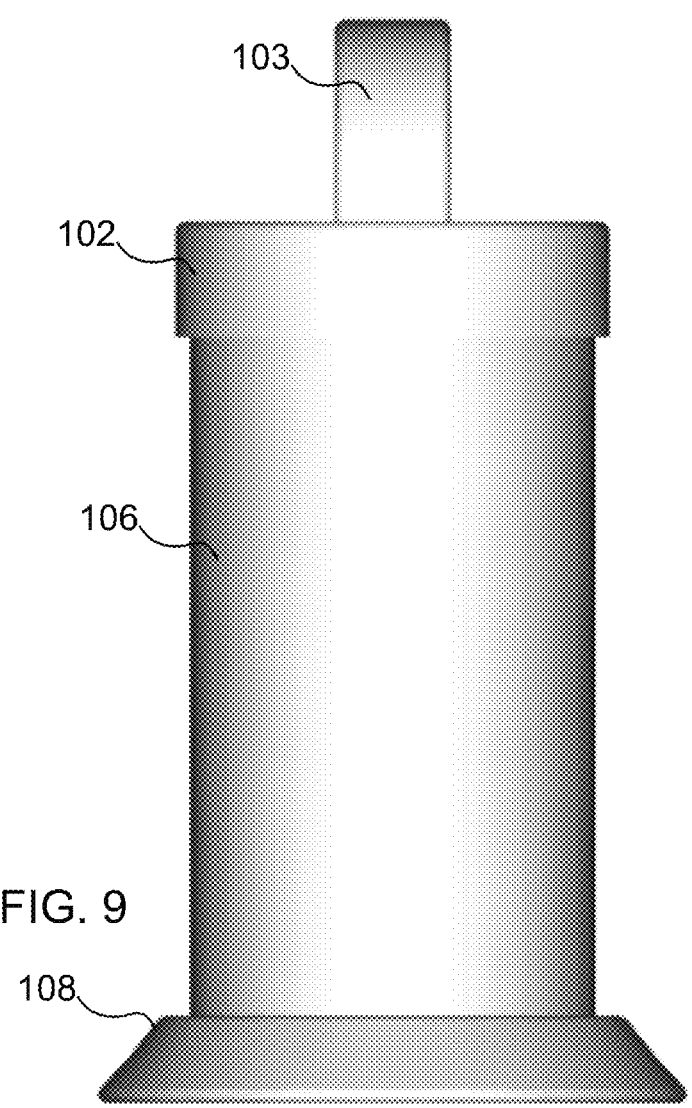
FIG. 9 is another side elevation of the embodiment shown in (FIG. 7)
Figure 10:
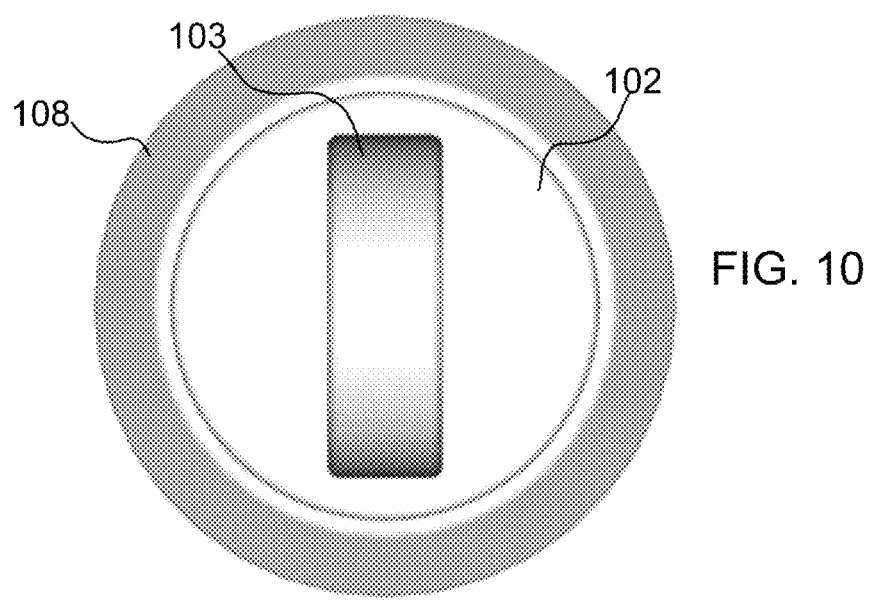
FIG. 10 is a top plan view of the embodiment shown in (FIG. 7)
Figure 11:
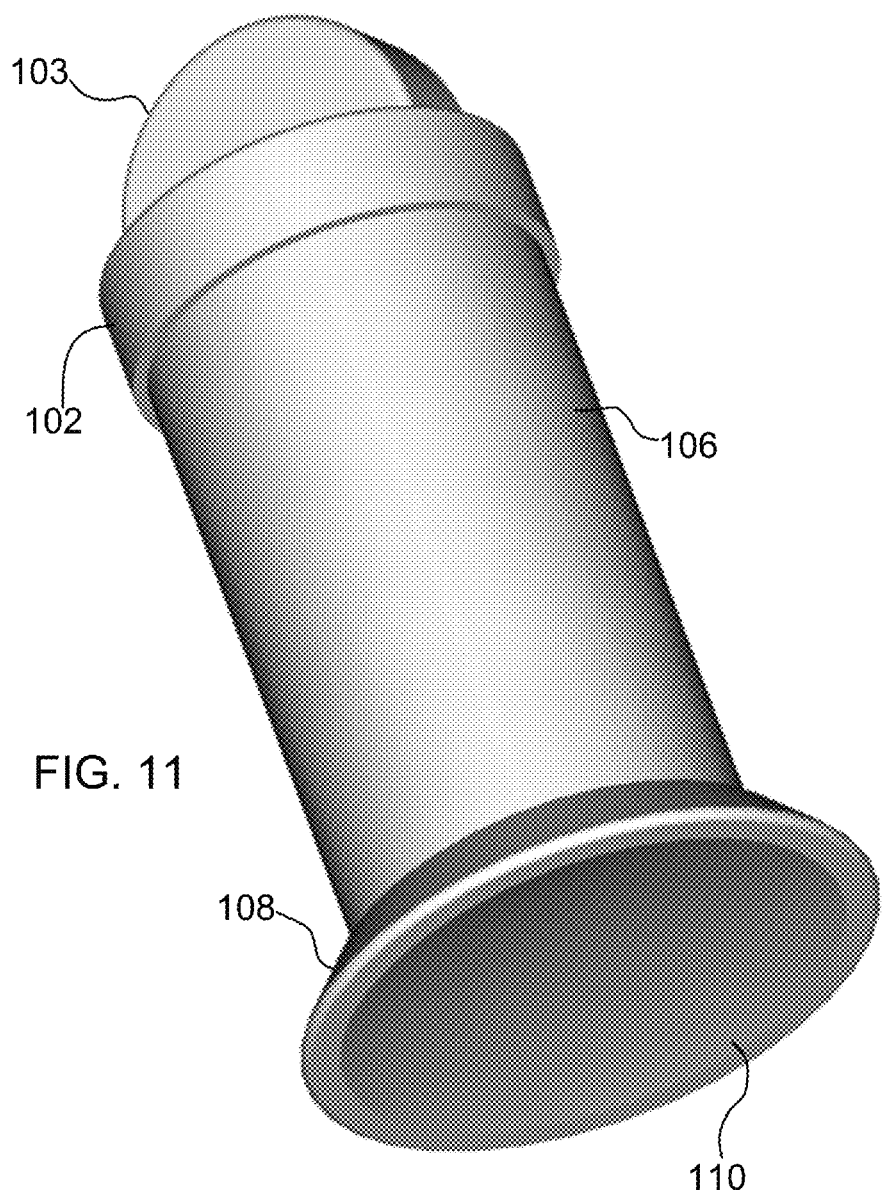
FIG. 11 is a tilted isometric view of the embodiment shown in (FIG. 7) showing a bottom of a food warming apparatus.
Figure 12:
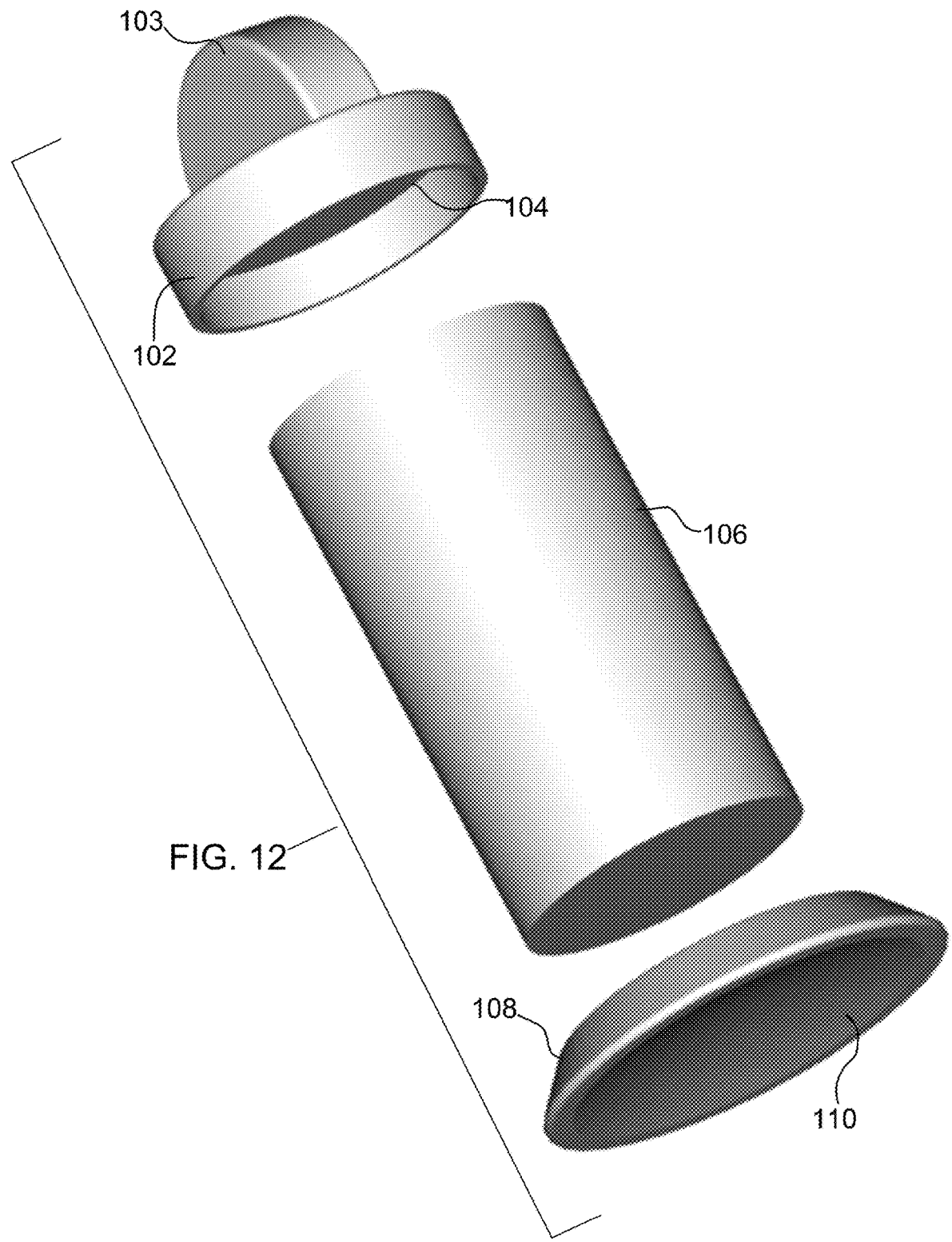
FIG. 12 is an exploded view of the embodiment shown in (FIG. 7)
Figure 13:
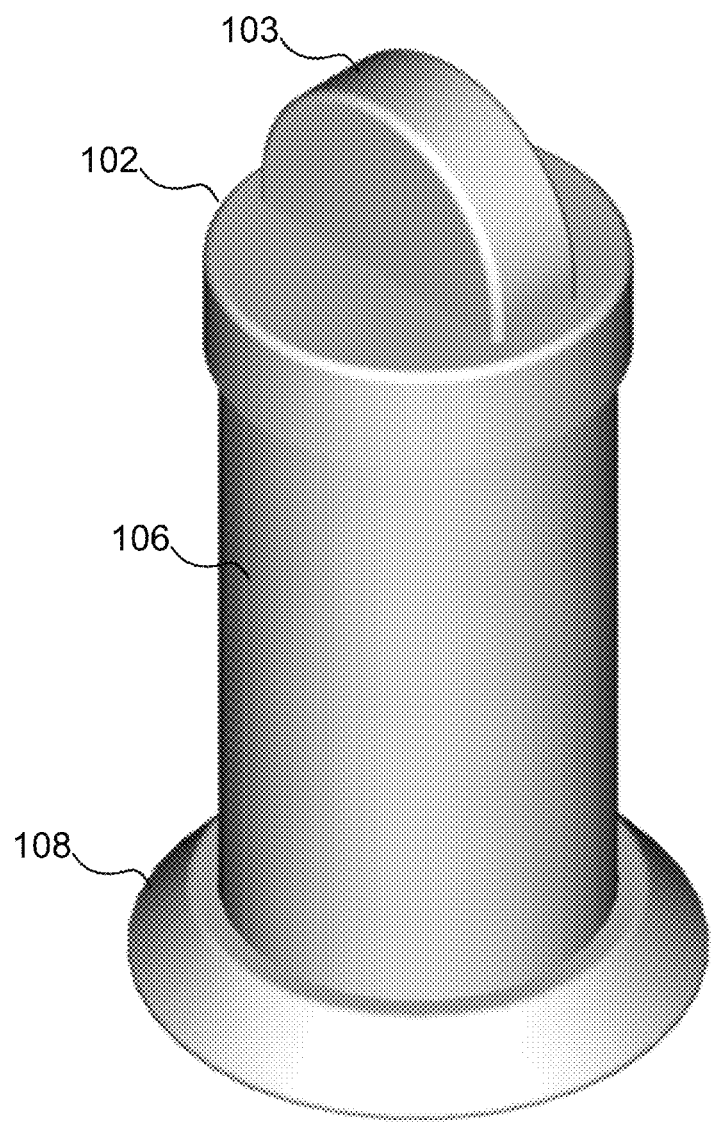
FIG. 13 is an isometric view of the embodiment shown in (FIG. 7) in a typical standing disposition.
Figure 14:
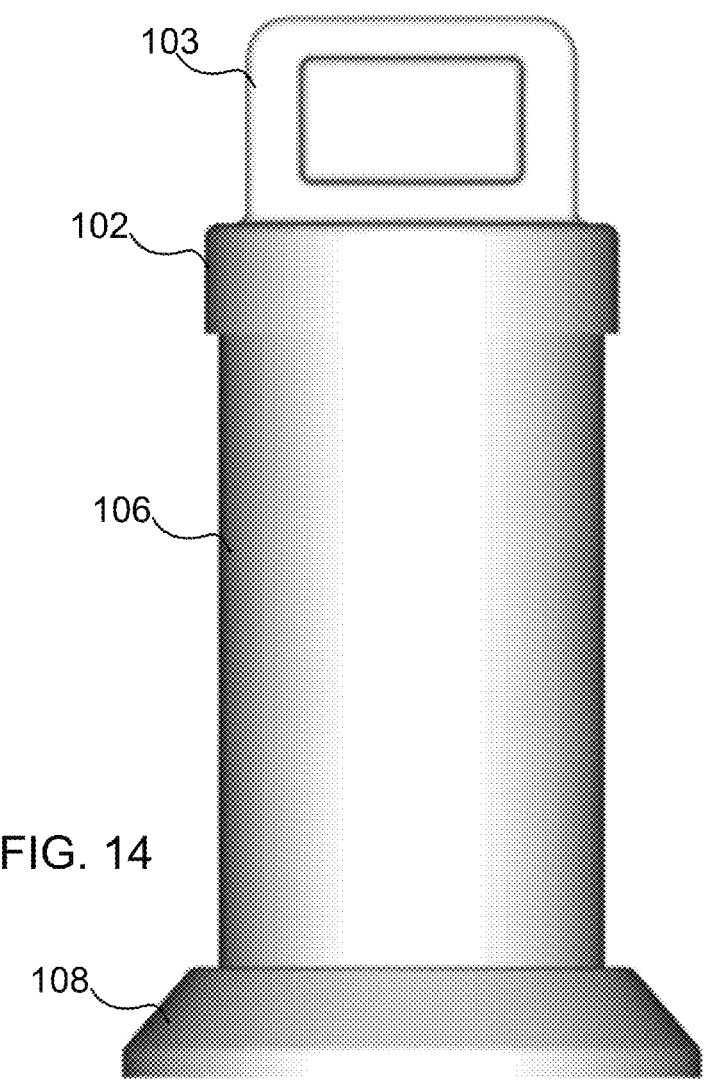
FIG. 14 is a side elevation of one embodiment according to the present invention.
Figure 15:
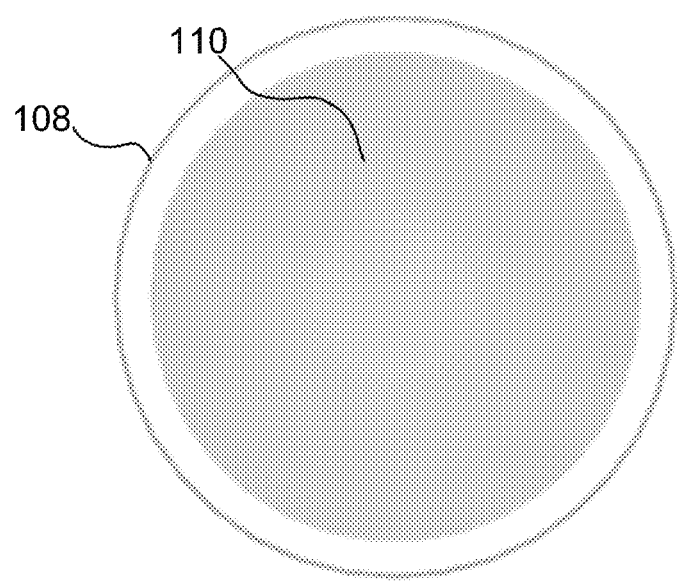
FIG. 15 is bottom plan view of the embodiment shown in (FIG. 14)
Figure 16:
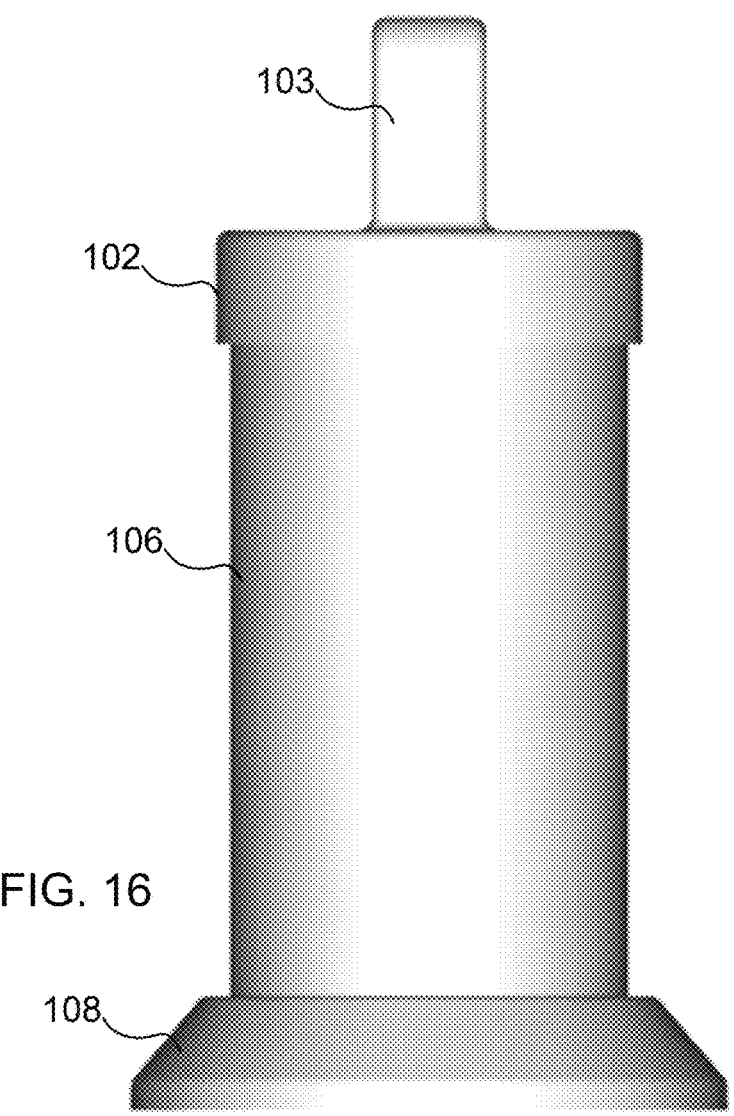
FIG. 16 is another side elevation of the embodiment shown in (FIG. 14)
Figure 17:
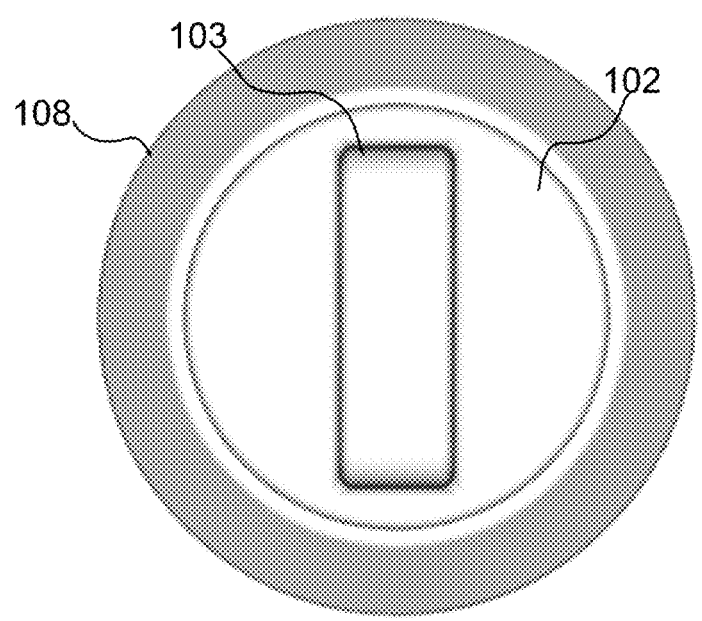
FIG. 17 is a top plan view of the embodiment shown in (FIG. 14)
Figure 18:
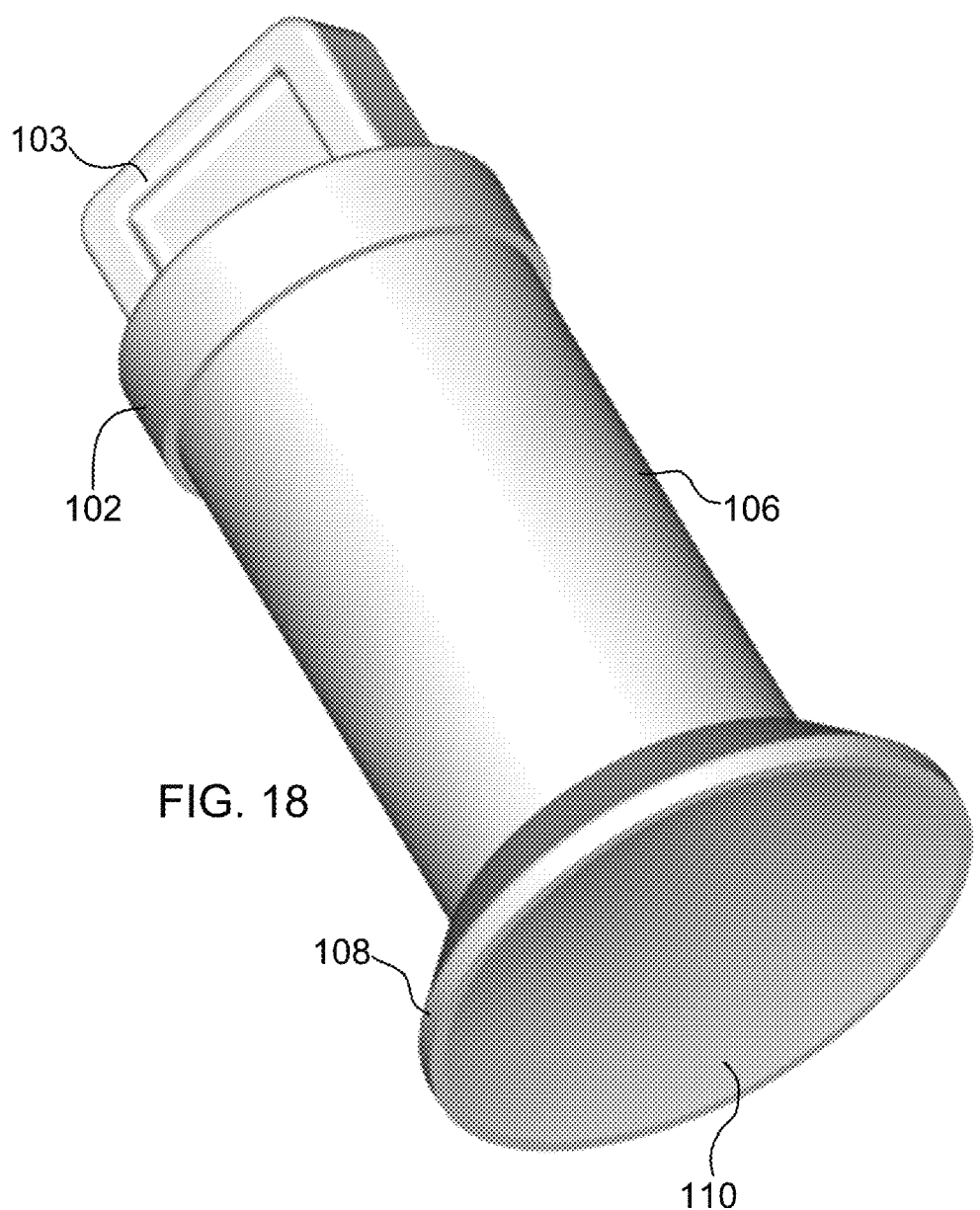
FIG. 18 is a tilted isometric view of the embodiment shown in (FIG. 14) showing a bottom of a food warming apparatus.
Figure 19:
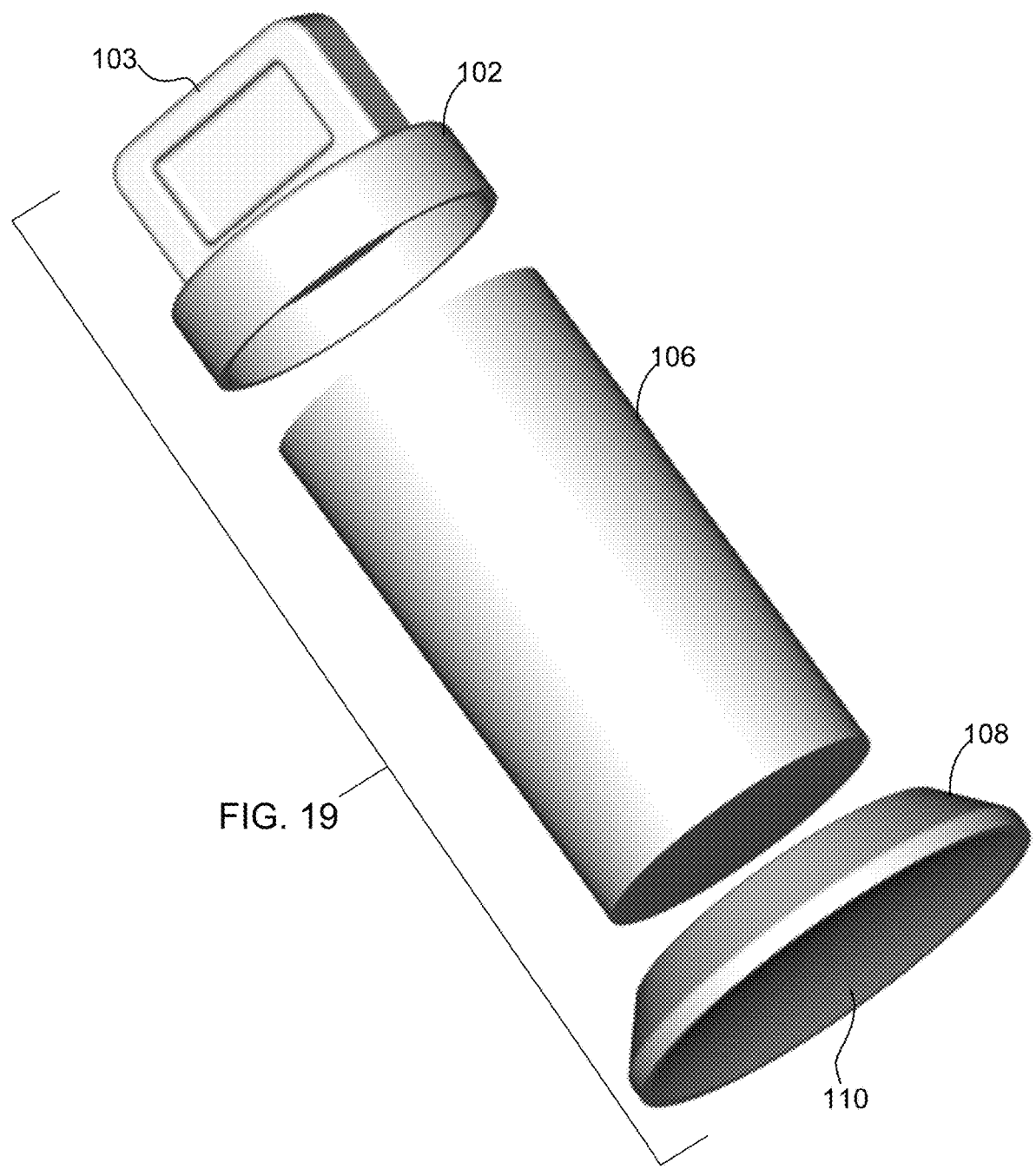
FIG. 19 is an exploded view of the embodiment shown in (FIG. 14)
Figure 20:
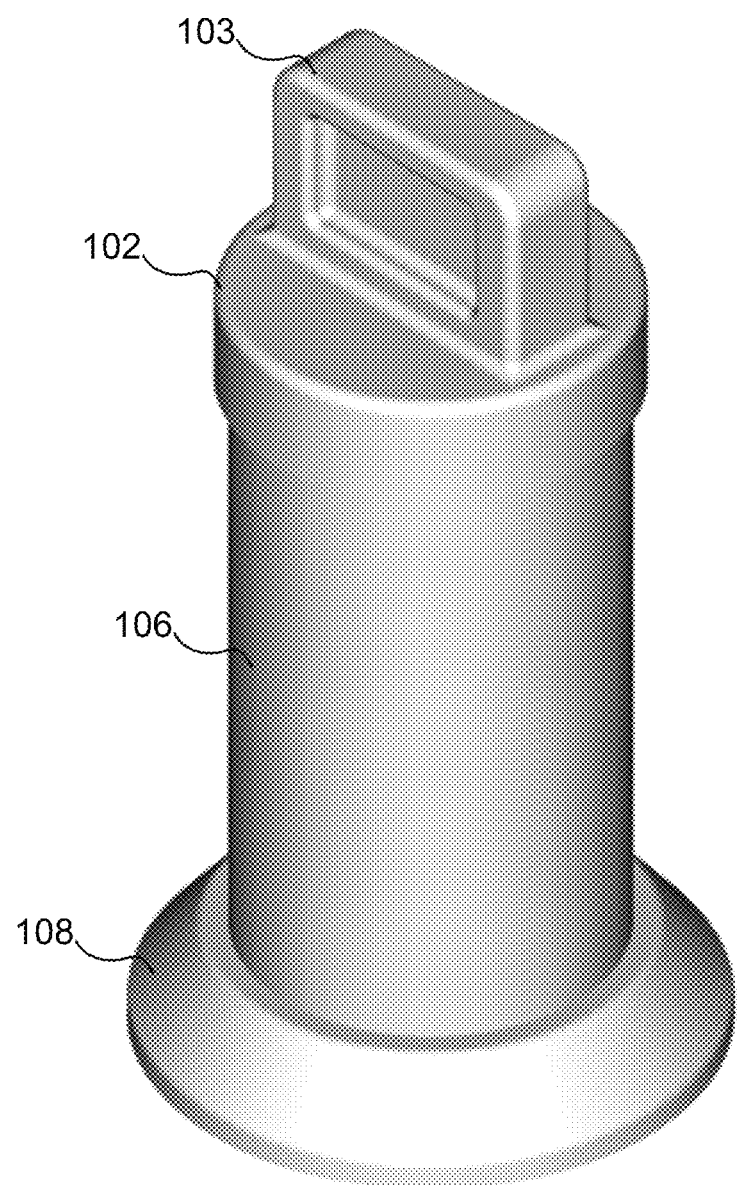
FIG. 20 is an isometric view of the embodiment shown in (FIG. 14) in a typical standing disposition.
Figure 21:
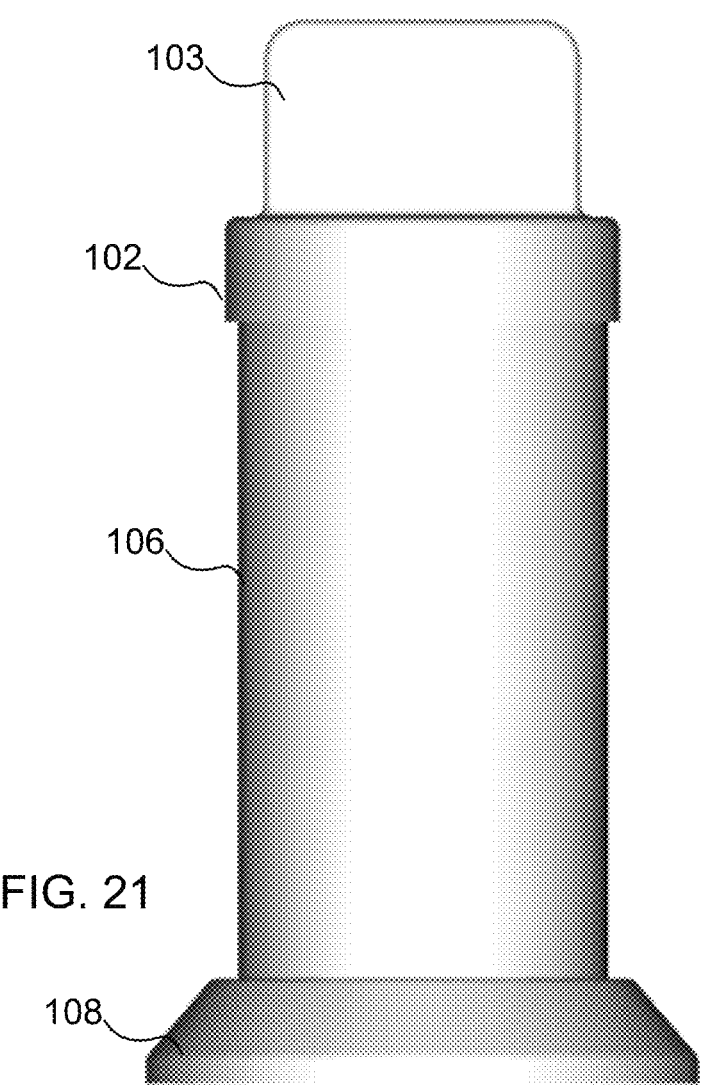
FIG. 21 is a side elevation of one embodiment according to the present invention.
Figure 22:
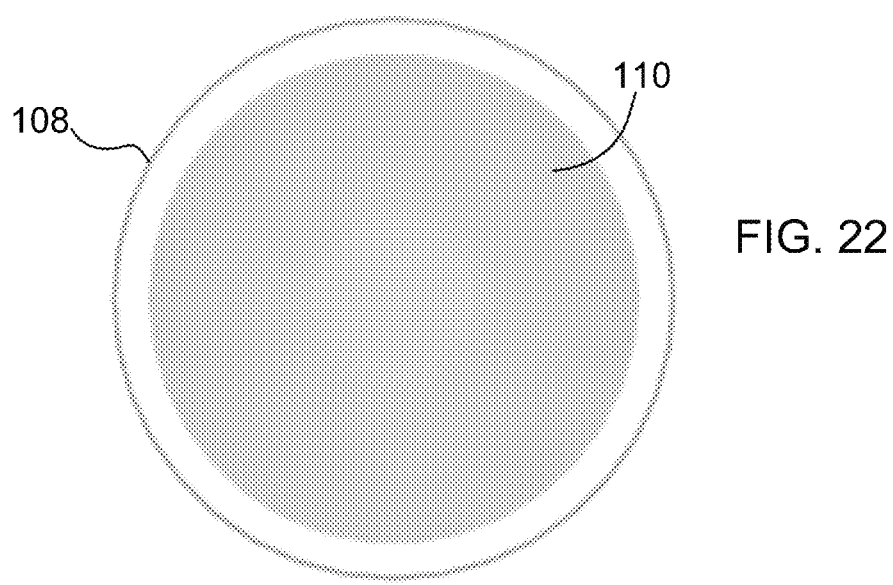
FIG. 22 is bottom plan view of the embodiment shown in (FIG. 21)
Figure 23:
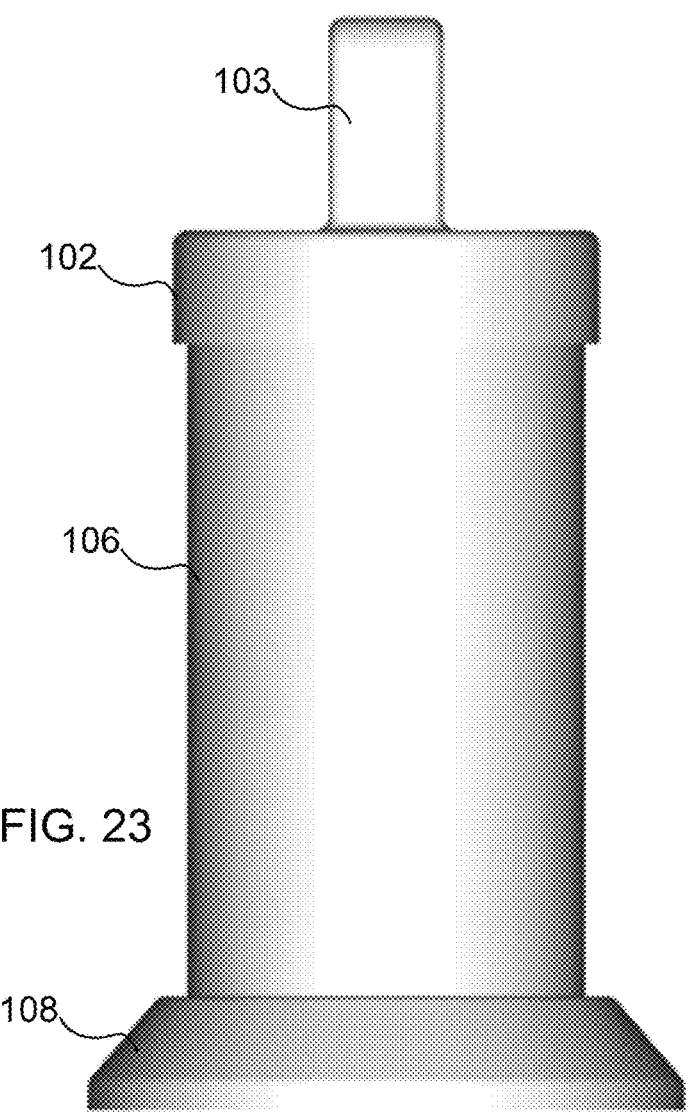
FIG. 23 is another side elevation of the embodiment shown in (FIG. 21)
Figure 24:
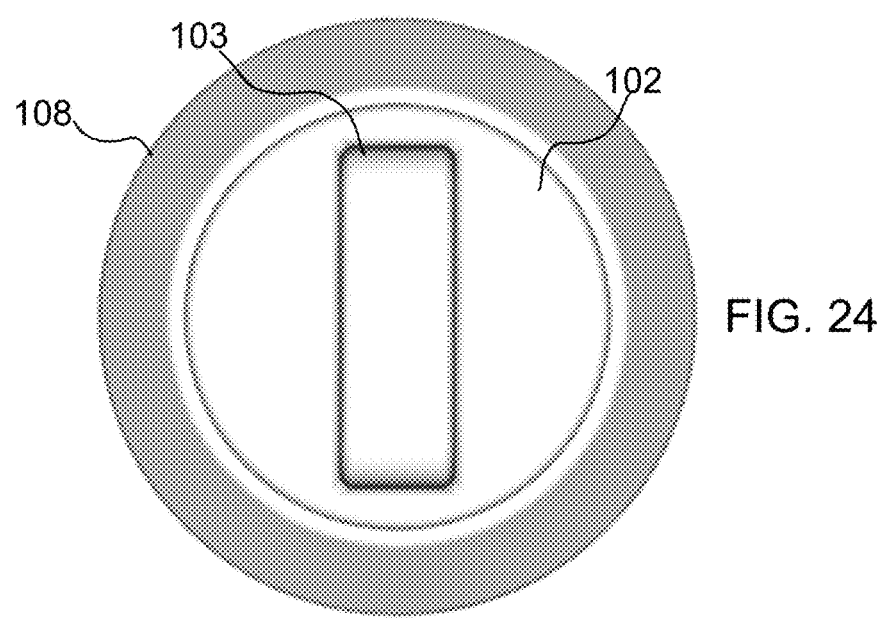
FIG. 24 is a top plan view of the embodiment shown in (FIG. 21)
Figure 25:
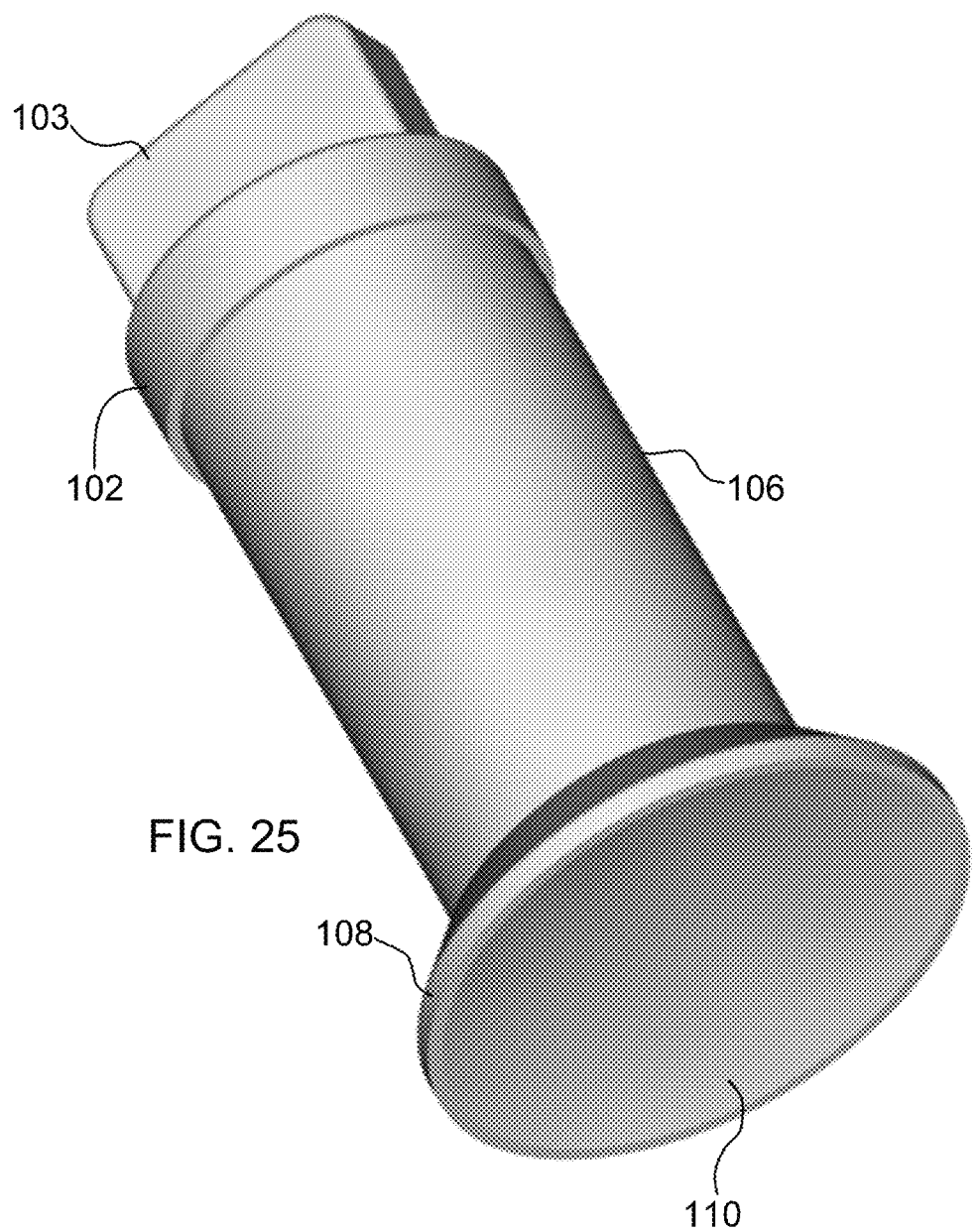
FIG. 25 is a tilted isometric view of the embodiment shown in (FIG. 21) showing a bottom of a food warming apparatus.
Figure 26:
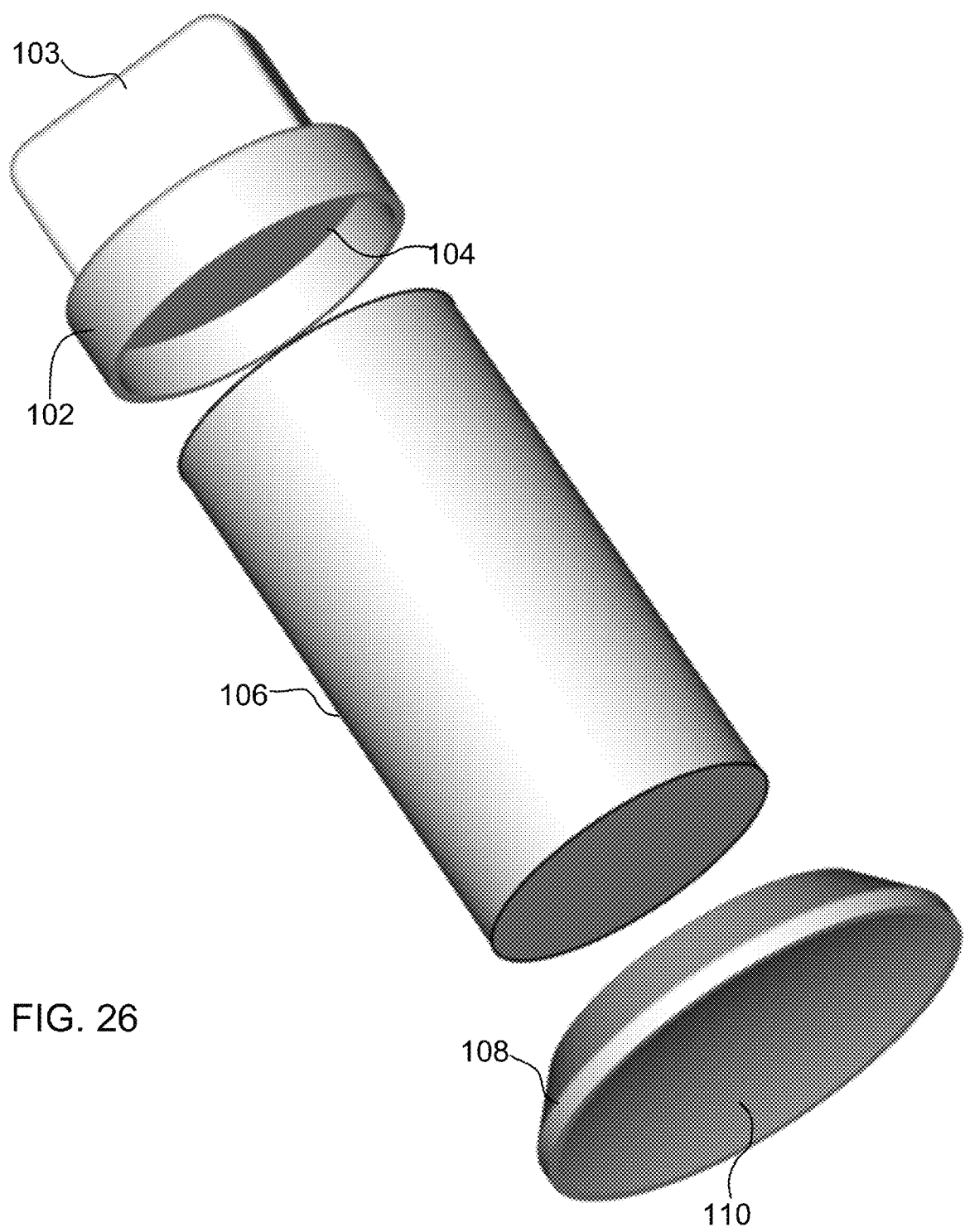
FIG. 26 is an exploded view of the embodiment shown in (FIG. 21)
Figure 27:
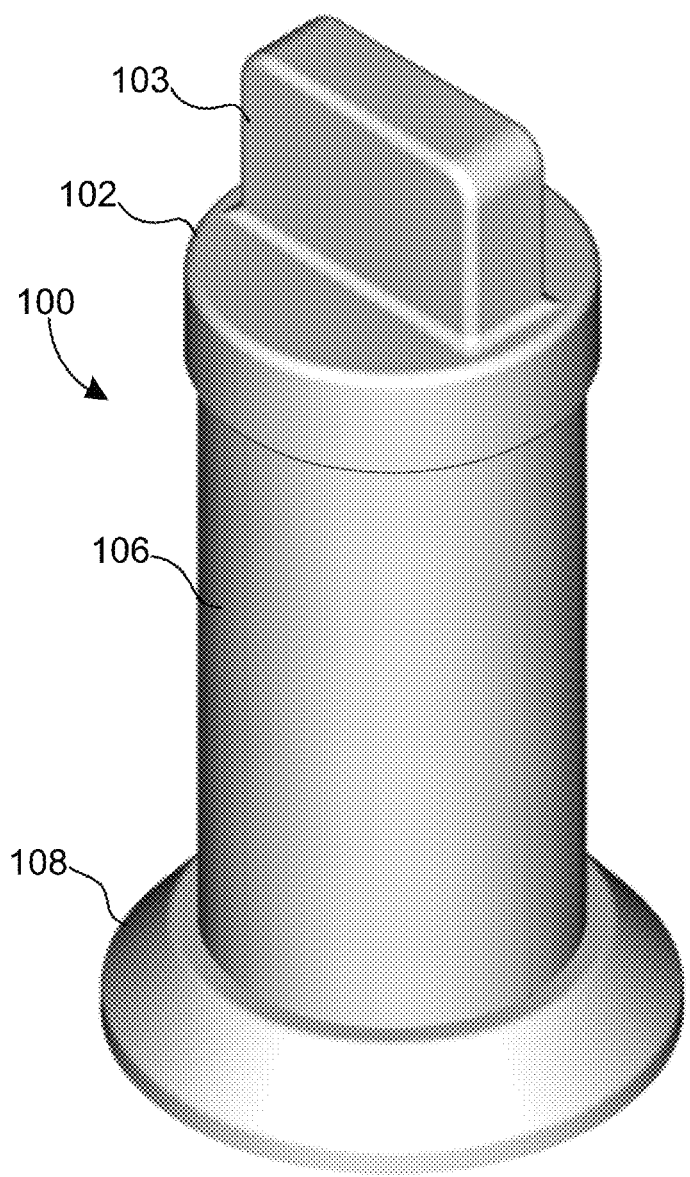
FIG. 27 is an isometric view of the embodiment shown in (FIG. 21) in a typical standing disposition.

Referring generally to FIGS. 1-27, a food warming apparatus in accordance with the present invention includes a lithic column 106 and a top portion 102 and base portion 108 disposed at opposite ends of the lithic column. Typically, the top portion may include a handle portion 103 comprised of a heat resistant material or a material with low heat conductivity, e.g., thermal conductivity of less than 1.4 [W/(m*K)]. so that the handle is comfortable to the touch even after heating in a microwave oven. Persons having skill in the art will appreciate that materials as various as ceramics, wood, glass, cork and microwave safe plastics will be suitable materials. Typically, for purposes of stability the base portion 108 includes a larger diameter than the lithic column. The base portion may include an indentation or concavity on a bottom side to accommodate bowls with a slight center bulge. While typically, the base portion is attached to the lithic portion, it is conceivable that the base portion, the lithic portion and the top portion are separable (see FIGS. 5, 12, 19 and 26). If the top portion and base portion are separable from the lithic column, the base portion and top portion may include a recess whereby the lithic column is seated and secured by a friction fit. It is also possible that the base portion is also a lithic body that includes the same or similar physical properties of the lithic column and may or may not be permanently attached to the lithic column.

FIGS. 4, 11, 18 and 25 best show an exemplary concavity on the bottom side of base portion 108. Persons having skill in the art will appreciate other structural configurations that will allow for stable seating of the apparatus in a soup bowl. For example, the base portion may be arch shaped with one or more channels allowing the passage therethrough and intermingling of fluid comestible. The base portion may include feet. Likewise, the top portion is not limited to the particular embodiments depicted and may simply be a loop, tab or cord attached to a top surface of the lithic column.

In order to use the invention, the apparatus is placed in the center of a bowl typically used to heat a soup-type comestible. The soup is poured into the bowl and around the apparatus. The bowl, now including the apparatus and the soup, is placed in a microwave oven and heated for a specified length of time which is typically less than the recommended time for canned soup owing to the thermal properties of the apparatus. Once the soup is at the desired temperature, it is removed from the microwave oven and served with or without the apparatus. If the apparatus is maintained in place, it serves as an excellent thermal reservoir that will maintain the soup temperature at a recommended serving temperature much longer than without its use (see tables 1.0 and 2.0) below.

Case 1

The following results were obtained using a lithic column of serpentinite of 1 inch in diameter and 2 inches in length. A quantity of 16 ounces of tomato soup was microwaved on high in a 900 watt microwave oven for two minutes and removed. Simultaneous temperature readings by multiple digital probes were taken at various locations in the soup filled bowl with the apparatus in place.

TABLE 1.0

|  | Minutes after removal from microwave oven | | | | |
| --- | --- | --- | --- | --- | --- |
|  | 1 | 2 | 3 | 4 | 5 |
| Temp (F. °) without apparatus | 143.0 | 139.7 | 135.7 | 134.5 | 133.4 |
| Temp (F. °) with apparatus | 154.0 | 155.3 | 154.2 | 149.3 | 146.6 |
| Difference (F. °) | 11 | 15.6 | 18.5 | 14.8 | 13.2 |

Case 2

The following results were obtained using a lithic column of granite of 1 inch in diameter and 2 inches in length. A quantity of 15 ounces of whole kernel corn was microwaved on high in a 1200 watt microwave oven for 1.5 minutes and removed. Simultaneous temperature readings by multiple digital probes were taken at various locations in the soup filled bowl with the apparatus in place.

TABLE 2.0

|  | Minutes after removal from microwave oven | | | | |
| --- | --- | --- | --- | --- | --- |
|  | 1 | 2 | 3 | 4 | 5 |
| Temp (F. °) without apparatus | 145.1 | 142.2 | 139.4 | 137.2 | 135.0 |
| Temp (F. °) with apparatus | 151.0 | 148.9 | 147.1 | 145.1 | 143.0 |
| Difference (F. °) | 5.9 | 6.7 | 7.7 | 7.9 | 8 |

In Case 1 the obtained values indicate that the soup exits the microwave oven more than 10 degrees warmer than without the use of the apparatus and is at least 13 degrees warmer after 5 minutes of cooling. While persons having skill in the art will appreciate that different foods will cool at different rates, the data indicates that the apparatus both augments the heating process and functions as an effective thermal reservoir once the soup is left to cool. Because the apparatus reduces the time it takes to obtain a desired food temperature, the apparatus may also reduce overall energy consumption. In Case 2, although the temperature difference is not as great as with Case 1, after 5 minutes of cooling the food in the bowl containing the apparatus is 8 degrees warmer than the bowl lacking the apparatus.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. An apparatus for warming a comestible comprising:
    a lithic column selected from at least one of the following: metamorphic rock, igneous rock, serpentine, marble;
    a base portion configured for stable support of the lithic column, the base portion including a maximum diameter that exceeds a maximum diameter of the lithic column;
    a top portion with a handle, the top portion including a material with a low thermal conductivity; and,
    wherein the apparatus is microwavable and configured for placement in a soup bowl.

2. A method of evenly heating a microwavable comestible comprising the steps of:
    providing a food warming apparatus including a lithic column and a top portion and a base portion at opposite ends of the lithic column;
    placing the food warming apparatus in a bowl wherein the food warming apparatus is surrounded by a fluid or semi fluid comestible;
    placing the bowl, the comestible and the food warming apparatus surrounded by the comestible in a microwave oven;
    microwaving the bowl with the comestible and the food warming apparatus surrounded by the comestible for a length of time;
    removing the bowl with the comestible and the food warming apparatus surrounded by the comestible.

* * * * *